United States Patent
Bartley et al.

(10) Patent No.: US 6,997,297 B2
(45) Date of Patent: Feb. 14, 2006

(54) COUPLING ASSEMBLY

(75) Inventors: Gary Lee Bartley, Kalamazoo, MI (US); Jeffrey Allyn Baker, Zeeland, MI (US)

(73) Assignee: Eaton Corporation, Cleveland, OH (US)

( * ) Notice: Subject to any disclaimer, the term of this patent is extended or adjusted under 35 U.S.C. 154(b) by 31 days.

(21) Appl. No.: 10/796,456

(22) Filed: Mar. 9, 2004

(65) Prior Publication Data

US 2005/0199464 A1  Sep. 15, 2005

(51) Int. Cl.
*F16D 41/00* (2006.01)
(52) U.S. Cl. .................... 192/45; 188/82.84
(58) Field of Classification Search ..... 192/223–223.4, 192/45; 188/82.84, 134; 384/618, 619, 384/623

See application file for complete search history.

(56) References Cited

U.S. PATENT DOCUMENTS

| | | | | |
|---|---|---|---|---|
| 755,287 A | * | 3/1904 | Eveland | 384/623 |
| 1,300,386 A | * | 4/1919 | Hart | 384/623 |
| 2,117,633 A | * | 5/1938 | Smith | 384/623 |
| 2,959,458 A | * | 11/1960 | Kaye | 384/608 |
| 3,034,365 A | * | 5/1962 | Stieber | 476/68 |
| 4,850,458 A | | 7/1989 | Allan et al. | 188/134 |
| 5,655,636 A | | 8/1997 | Lang et al. | 192/7 |
| 6,089,363 A | * | 7/2000 | Mimura | 192/45 |
| 6,109,415 A | | 8/2000 | Morgan et al. | 192/223.1 |

* cited by examiner

*Primary Examiner*—Richard M. Lorence
(74) *Attorney, Agent, or Firm*—Marvin L. Union

(57) ABSTRACT

A roller thrust bearing assembly is effective to transmit force along a path extending between two members. The roller thrust bearing assembly includes a circular disc with an annular array of spaced apart slots. Each of the slots has a longitudinal central axis which is skewed at the same angle relative to disc radii. A plurality of roller bearings are disposed in each of the slots.

7 Claims, 2 Drawing Sheets

COUPLING ASSEMBLY

BACKGROUND OF THE INVENTION

The present invention relates to an improved roller thrust bearing assembly which is utilized in a coupling assembly.

Coupling assemblies are commonly utilized as a brake to transmit force which retards rotation of a member and/or as a clutch to transmit force which induces rotation of a member. Coupling assemblies have been utilized in bi-directional brakes in the manner disclosed in U.S. Pat. No. 4,850,458. In addition, actuator assemblies for horizontal stabilizers of aircraft have included coupling assemblies in the manner disclosed in U.S. Pat. No. 6,109,415. The actuators may utilize a coupling assembly to prevent back drive in the manner disclosed in U.S. Pat. No. 5,655,636.

SUMMARY OF THE INVENTION

The present invention provides a new and improved coupling assembly which includes a roller thrust bearing assembly. The roller thrust bearing assembly is effective to transmit force between a member and a base.

The roller thrust bearing assembly may include a circular disc with an annular array of spaced apart slots. Each slot of the annular array of slots may have a longitudinal central axis which is skewed at an angle relative to a disc radius extending through a center of the slot. In accordance with a feature of the present invention, a plurality of roller bearings are disposed in each slot of the plurality of slots.

The slots may all be of the same length and contain the same number of roller bearings. Alternatively, the slots may be of different lengths and contain different numbers of roller bearings.

BRIEF DESCRIPTION OF THE DRAWINGS

The foregoing and other features of the present invention will become more apparent upon a consideration of the following description taken in connection with the accompanying drawings wherein.

DESCRIPTION OF SPECIFIC PREFERRED EMBODIMENTS OF THE INVENTION

Figure 1:
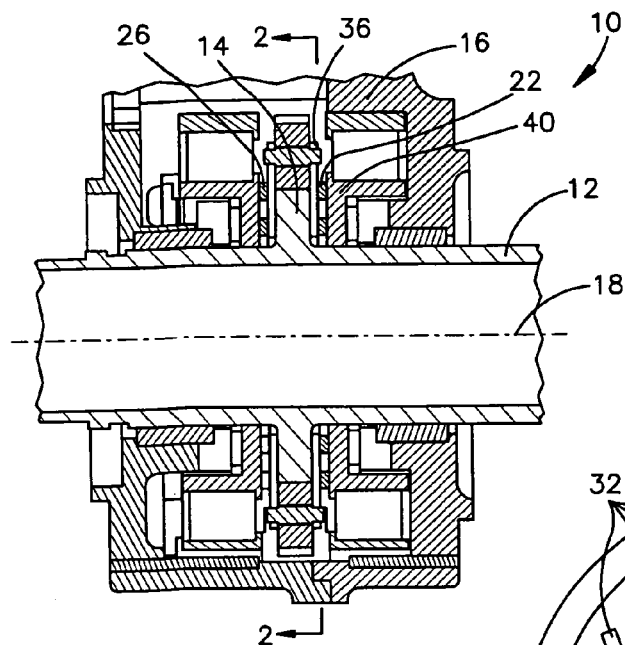
FIG. 1. is a schematic fragmentary sectional view of a known coupling.

A coupling assembly 10 includes a force transmitting member 12. Although the force transmitting member 12 may have may different constructions and may be utilized for many different purposes, the illustrated force transmitting member is a ball screw. The ball screw 12 is connected with a horizontal stabilizer on an aircraft.

The ball screw 12 has an annular flange 14 which is enclosed by a stationary base or housing 16. The coupling 10 transmits force from the ball screw 12 to the base or housing 16. The ball screw 12 is rotatable about its longitudinal central axis 18 while the housing 16 is held against rotation about the axis 18.

When the ball screw 12 tends to overrun in one direction, the flange 14 is pulled toward the right (as viewed in FIG. 1) to apply force against an improved roller thrust bearing assembly 22. When the ball screw 12 overruns in the opposite direction, the flange 14 is pulled toward the left (as viewed in FIG. 1) against another improved roller thrust bearing assembly 26. The two roller thrust bearing assemblies 22 and 26 have the same construction and mode of operation.

Generally speaking, the coupling 10 has a known construction and mode of operation. The coupling 10 is constructed in accordance with U.S. Pat. No. 6,109,415. The disclosure in the aforementioned U.S. Pat. No. 6,109,415 is hereby incorporated herein in its entirety by this reference thereto. Alternatively, the coupling 10 may be constructed as disclosed in U.S. Pat. Nos. 4,850,458 and/or 5,655,636. The disclosures in the aforementioned U.S. Pat. Nos. 4,850,458 and 5,655,636 are hereby incorporated herein in their entirety by this reference thereto. However, it should be understood that the thrust bearing assembly 22 may be used with couplings having a construction which is different than the construction of the coupling 10. For example, the thrust bearing assembly 22 may be used in association with clutch and/or brake assemblies having any one of many known constructions.

Figure 2:
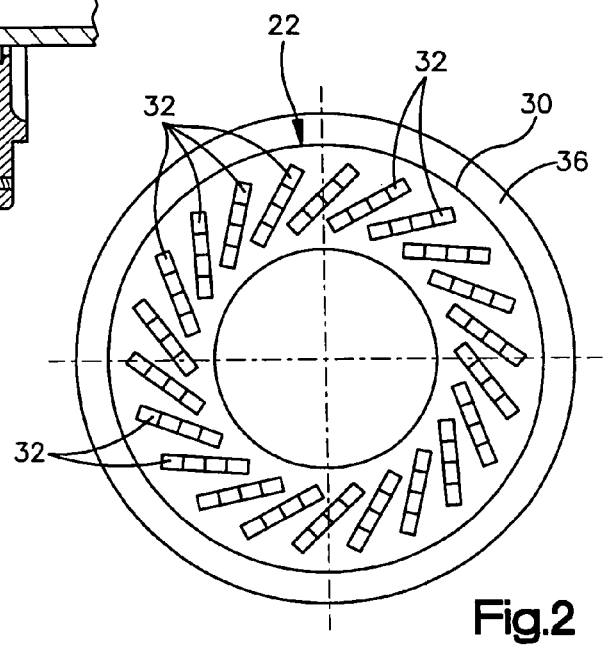
FIG. 2. is a plan view, taken general along the line 2—2 of FIG. 1, illustrating an improved roller thrust bearing assembly utilized in the coupling of FIG. 1.

The improved roller thrust bearing assembly 22 is illustrated in FIG. 2. The roller thrust bearing assembly 22 includes an annular disc or retainer member 30. A plurality of identical sets 32 of roller bearings are rotatably mounted in an annular array on the disc or retainer number 30. The sets 32 of roller bearings are effective to transmit force between a plate 36 connected with the flange 14 and a retarding member, specifically a nonrotatable brake member 40 connected to the stationary housing 16. In certain applications, such as in a positioning system, the brake or retarding member 40 may rotate.

Figure 3:
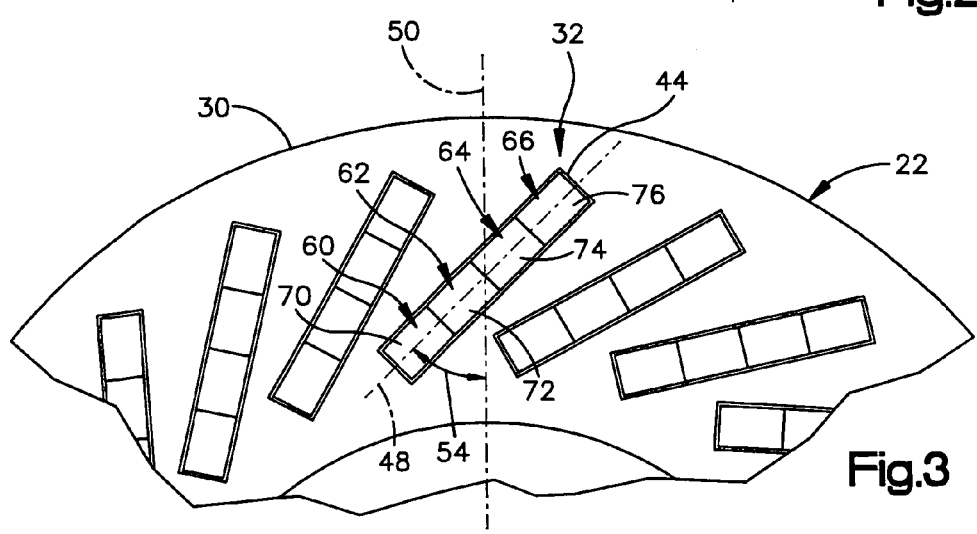
FIG. 3. is an enlarged schematic plan view of a portion of FIG. 2 and illustrating the relationship of a plurality of roller bearings to a slot in the roller thrust bearing assembly, and FIG. 4. is a schematic plan view of an embodiment of the roller thrust bearing assembly having slots of different lengths.

Each set 32 of roller bearings is disposed in a rectangular slot 44 in the disc 30 (FIG. 3). The disc 30 functions as a retainer member 30 for the sets 32 of roller bearings. The disc 30 may have a different construction if desired. For example, the disc 30 may be a cage.

Each of the identical rectangular slots 44 has a longitudinal central axis 48 which is skewed at an angle, indicated at 54 in FIG. 3, relative to a radius 50 of the disc 30. The angle 54 is, in most embodiments of the invention, less than ninety degrees. The disc radius 50 extends through a center of the slot 44. In the specific embodiment illustrated in FIG. 3, the central axis 48 of the slot 44 extends at an acute angle, indicated at 54 in FIG. 3, of forty-five degrees to the radius 50. However, the central axis 48 of the slot 44 may extend at a different angle to the radius 50 if desired. The central axis 48 of the slot 44 is spaced from and extends perpendicular to a central axis of the disc 30.

Although the slot 44 has been illustrated in FIG. 3 as having a rectangular configuration, it is contemplated that the slot 44 may have a different configuration. For example, the slot 44 may have a series of offset sections in which one or more rollers are disposed.

In accordance with a feature of the present invention, there are a plurality of roller bearings 60, 62, 64 and 66 in each set 32 of roller bearings. The identical roller bearings 60–66 are disposed in the slot 44. Circular ends of the roller bearings 60, 62, 64 and 66 are disposed in engagement. For example a radially inner end of the roller bearing 62 engages a radially outer end of the roller bearing 60. Similarly, a radially outer end of the roller bearing 62 engages a radially inner end of the roller bearing 64.

Each of the roller bearings 60–66 has a cylindrical configuration. Thus, the roller bearing 60 has a cylindrical outer side surface 70. Similarly, the roller bearings 62, 64 and 66 have cylindrical outer side surfaces 72, 74 and 76. The cylindrical outer side surfaces 70–76 of the roller bearings 60–66 transmit force from the flange plate 36 to the brake member 40 when a tendency for the ball screw 12 to overrun results in the flange 14 being pulled toward the right (as viewed in FIG. 1). This presses the roller bearings against the brake member 40.

The identical roller bearings 60–66 are rotatable in the slot 44 about their common central axis 48. Since each of the roller bearings 60–66 is located at a different radial distance from the center of rotation of the disc or plate 30, each of the roller bearings will be rotated at different angular velocities about the center of the disc 30 during relative rotation between the disc and the flange 14 and/or brake member 40. Thus, the roller bearing 60 will rotate at a relatively slow angular velocity and the roller bearing 66 will rotate at a relatively high angular velocity during rotation of the disc 30.

Since there are a plurality of roller bearings 60–66, each of the roller bearings moves with the disc 30 at an angular velocity which is a function of the speed of rotation of the disc 30 and the distance which the roller bearing is spaced from a center of the disc. During rotation of the disc 30, the angular velocity of the roller bearing 60 will be relatively small and the angular velocity of the roller bearing 66 will be relatively large compared to the roller bearing 60.

In addition to being rotatable with the disc 30, the roller bearings 60–66 are rotatable relative to the disc and to each other about the longitudinal central axis 48 of the slot 44. The further a roller bearing is spaced from the center of the disc 30, the greater will be its rate of rotation about the axis 48. Thus, the roller bearing 66 will rotate faster about the axis 48 than will the roller bearing 60.

As was previously mentioned, the ends of the roller bearings 60–66 are disposed in engagement. The end of the roller bearing 64 engages an end of the roller bearing 62. Since the roller bearing 64 rotates faster than the roller bearing 62, there will be sliding movement of the end of the roller bearing 64 relative to the end of the roller bearing 62. The roller bearings 60–66 may be mounted on the disc 30 so that ends of the bearings are spaced apart to eliminate sliding movement of an end of one bearing on an end of an adjacent bearing.

The roller bearings 60–66 are rotatably mounted on the disc 30 by indenting or staking the disc in the manner disclosed in the aforementioned U.S. Pat. No. 4,850,458. However, the roller bearings 60–66 may be mounted on the disc 30 in a different manner if desired. For example, a cage may be provided to hold the roller bearings 60–66.

Since the roller bearings 60–66 are skewed at the acute angle 54 relative to a radius 50 of the disc 30, the roller bearings 60–66 are effective to transmit a braking coupling force between the flange plate and the brake member 40. This results in a combination of both sliding and rolling motion being imparted to each of the rollers 60–66 by the interaction between the cylindrical surfaces of the rollers and the flange plate 36 and brake member 40. This braking or coupling action retards rotation of the ball screw 12 relative to the base or housing 16. By coupling the flange 14 on the ball screw 12 to the stationary base or housing 16 through the roller thrust bearing assembly 22, overrunning rotation of the input member or the ball screw 12 is retarded.

In accordance with a feature of the present invention, there are a plurality of roller bearings 60–66 disposed in the slot 44. The roller bearings 60–66 can transmit a relatively large load without excessive deformation. In addition, utilizing a plurality of roller bearings 60–66 in the slot 44 enables the diameter of the roller bearings to be minimized. Of course, this contributes to a compact construction for the coupling 10.

In the embodiment of the invention illustrated in FIGS. 2 and 3, each of the identical sets 32 of roller bearings includes four roller bearings 60–66. It is contemplated that either a greater or lesser number of roller bearings may be provided in each of the sets 32 of roller bearings.

For optimum braking coupling force, it has previously been determined by others that the roller bearings 60–66 should have a length to diameter ration (L/D) of 1.5 to 2. A maximum length to diameter ratio has previously been determined to be 3. This known ratio of length to diameter (L/D) is required in order to obtain braking coupling force of the bearings 60–66–when there is relative rotation between the disc 30 and the flange 14 and/or brake member 40.

In order to increase the load which is transmitted through the bearings 60–66 to the flange 14 and/or brake member 40, it is necessary to increase the combined length of the bearings 60–66. If a single bearing is provided, in the manner disclosed in the aforementioned U.S. Pat. Nos. 4,850,458; 5,655,636 and/or 6,109,415, the diameter of the single bearing increases as its length increases. The increase in the diameter of a single bearing with an increase in length of the bearing is necessary in order to maintain the desired length to diameter ratio for the bearing. However, the relatively large diameter of a long single bearing makes the coupling 10 excessively large in a direction parallel to the axis 18 (FIG. 1).

By providing a plurality of bearings 60–66, the combined axial length of the bearings can be made relatively large while the diameter bearings remains relatively small. By having the combined length of the bearings relatively large, the total load which can be transmitted by the bearings 60–66 is relatively large. However, each of the bearings has a relatively short length. Therefore, the length to diameter ratio for any one of the bearings 60–66 can be relatively small, that is, in the desired range of 1.5 to 2. This results in each of the bearings 60–66 being loaded in the desired manner during relative rotation between the disc 30 and the flange 14 and/or brake member 40.

Although the improved roller thrust bearing assembly 22 has been described herein in conjunction with one specific known coupling assembly 10, it is contemplated that the roller thrust bearing assembly may be used in other known couplings. The improved roller thrust bearing assembly 22 may be used in couplings which function as brakes and/or clutches.

Figure 4:
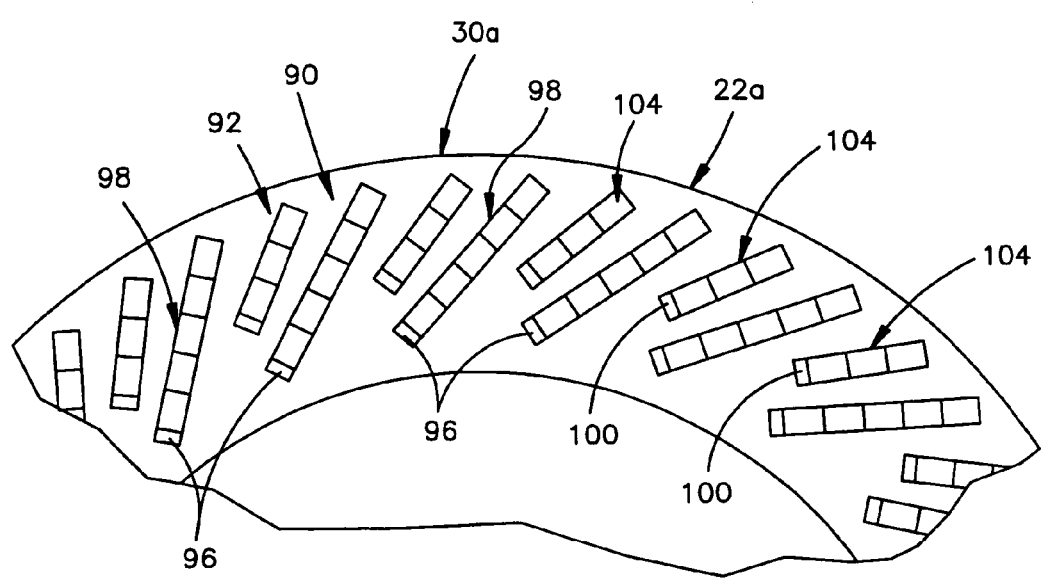

In the embodiment of the invention illustrated in FIGS. 2 and 3, the roller thrust bearing assembly 22 includes a plurality of slots 44 of the same length. In the embodiment of the invention illustrated in FIG. 4, the thrust bearing assembly includes a plurality of long slots with short slots interspersed between the long slots to increase the number of roller bearings to transmit force. Since the embodiment of the invention illustrated in FIG. 4 is generally similar to the embodiments of the invention illustrated in FIGS. 1–3, similar numerals will be utilized to designate similar components, the suffix letter "a" being associated with the numerals of FIG. 4 to avoid confusion.

A roller thrust bearing assembly 22a (FIG. 4) includes an annular disc or retainer member 30a. In order to increase the load transmission capabilities of the roller thrust bearing assembly 22a, a first annular array 90 of roller thrust bearing is provided on the disc 30a with a second annular array 92 of roller thrust bearings interspersed with the first annular array.

The first annular array 90 of roller thrust bearings include relatively long rectangular slots 96. Relatively long sets 98 of roller bearings are disposed in the long slots 94. The sets 98 of roller bearings all have bearings with the same construction. In the illustrated embodiment of the invention, each set 98 of roller bearings includes five identical roller bearings. Of course, a greater or lesser number of bearings may be provided in each set 98 of roller bearings.

The second annular array 92 includes relatively short rectangular slots 100 which are formed in the disc 30a. The short slots 100 are interspersed with the long slots 96. Thus, there is a short slot 100 between each pair of long slots 96. The radially inner ends of the short slots 100 are disposed radially outward of the inner ends of the long slots 96. However, the outer ends of the short slots 100 are disposed at the same radial distance from the center of the disc 30 as are the outer ends of the long slots 96.

Short sets 104 of roller bearings are disposed in the short slots 100. In the specific embodiment of the invention illustrated in FIG. 4, the long sets 98 of roller bearings contain five identical roller bearings. The short sets 104 of roller bearings contain three identical roller bearings. It should be understood that a greater or lesser number of roller bearings may be provided in either the long sets 98 of roller bearings or the short sets 104 of roller bearings. The roller bearings in the long and short sets 98 and 104 of roller bearings have the same construction as the roller bearings 60–66 of FIG. 3.

By providing a plurality of roller bearings in each of the long sets 98 and short sets 104 of roller bearings, the combined axial length of the bearings can be made relatively large while the diameter of the bearings remains relatively small. By having the combined length of the bearings relatively large, the total load which can be transmitted by the long sets 98 and short sets 104 of roller bearings is relatively large. However, each of the roller bearings in the long sets 98 of roller bearings and the short sets 104 of roller bearings has a length to diameter ratio in the desired range at 1.5 to 2. This results in the roller bearings being loaded in a desired manner during relative rotation between the disc 30a and an associated member to which force is to be transmitted through the roller bearings.

By providing a relatively short sets of roller bearings 104 between the relatively long sets 98 of roller bearings, the number of roller bearings which is provided on a disc 30a of a given diameter can be maximized. This enables the disc 30 to transmit a relatively large force through the long and short sets 98 and 104 of roller bearings.

CONCLUSION

In view of the foregoing description, it is apparent that the present invention provides a new and improved coupling assembly 10 which includes a roller thrust bearing assembly 22. The roller thrust bearing assembly 22 is effective to transmit force between a member 14 and a base 16.

The roller thrust bearing assembly may include a circular disc 30 with an annular array of spaced apart slots 44. Each slot 44 of the annular array of slots may have a longitudinal central axis which is skewed at an angle relative to a disc radius 50 extending through a center of the slot. In accordance with a feature of the present invention, a plurality of roller bearings 60–66 are disposed in each slot of the plurality of slots.

The slots 44 may all be of the same length and contain the same number of roller bearings 60–66. Alternatively the slots 44 may be of different lengths and contain different numbers of roller bearings.

Having described the invention, the following is claimed:

1. A coupling assembly comprising a base, a member which is movable relative to said base, and a roller thrust bearing assembly which is effective to transmit force along a force transmission path extending between said member and said base, said roller thrust bearing assembly includes a disc with an annular array of spaced apart slots, each slot of said annular array of slots having a longitudinal central axis which is skewed at an angle relative to a disc radius extending through a center of the slot, and a plurality of roller bearings disposed in each slot of said plurality of slots, said annular array of slots includes first slots having a first length and second slots having a second length which is less than said first length, said second slots being interspersed with said first slots in said annular array of slots.

2. A coupling assembly as set forth in claim 1 wherein each one of said roller bearings in each of said slots has a central axis which extends parallel to the longitudinal central axis of the slot in which said one roller bearing is disposed.

3. A coupling assembly as set forth in claim 2 wherein said plurality of roller bearings in each of said slots are disposed in a coaxial relationship.

4. A coupling assembly as set forth in claim 2 wherein said plurality of roller bearings includes five bearings disposed in a coaxial relationship in each of said first slots and three bearings disposed in a coaxial relationship in each of said second slots.

5. A coupling assembly as set forth in claim 2 wherein each of said roller bearings has a length to diameter ration of three or less.

6. A coupling assembly as set forth in claim 2 wherein each of said roller bearings of said plurality of roller bearings in each of said slots has an end surface which is disposed in engagement with an end surface on a next adjacent roller bearing.

7. A coupling assembly as set forth in claim 2 wherein each of said first slots contains a first number of roller bearings and each of said second slots contains a second number of roller bearings, said second number being less than said first number.

* * * * *